US012706401B2

(12) United States Patent
Hamner et al.

(10) Patent No.: US 12,706,401 B2
(45) Date of Patent: Aug. 11, 2026

(54) CABLE CARD ASSEMBLY OF AN ELECTRICAL CONNECTOR

(71) Applicant: TE Connectivity Solutions GmbH, Schaffhausen (CH)

(72) Inventors: Richard Elof Hamner, Middletown, PA (US); Earl Daughtry, Middletown, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 361 days.

(21) Appl. No.: 18/582,109

(22) Filed: Feb. 20, 2024

(65) Prior Publication Data

US 2025/0266628 A1 Aug. 21, 2025

(51) Int. Cl.

*H01R 13/6592* (2011.01)
*H01R 12/53* (2011.01)
*H01R 12/72* (2011.01)

(52) U.S. Cl.

CPC ........... *H01R 12/53* (2013.01); *H01R 12/721* (2013.01)

(58) Field of Classification Search

CPC ................. H01R 12/53; H01R 12/721; H01R 13/65914; H01R 13/648; H01R 12/716; H01R 12/75; H01R 13/65918; H01R 13/6594; H01R 13/665

See application file for complete search history.

(56) References Cited

U.S. PATENT DOCUMENTS

| | | | | |
|---|---|---|---|---|
| 10,367,294 | B1 * | 7/2019 | Smith | H01R 12/69 |
| 10,714,237 | B1 * | 7/2020 | Hamner | H01R 24/56 |
| 11,381,038 | B1 * | 7/2022 | Patel | H01R 13/65914 |
| 11,695,234 | B2 * | 7/2023 | Simpson | G02B 6/4246 439/470 |
| 2013/0005182 | A1 * | 1/2013 | Ratzlaff | H01R 13/648 439/607.01 |
| 2013/0130547 | A1 * | 5/2013 | Simpson | H01R 13/6581 439/607.01 |
| 2017/0025797 | A1 * | 1/2017 | Keyser | H01R 12/53 |
| 2018/0337483 | A1 * | 11/2018 | Henry | H01R 12/714 |
| 2020/0366017 | A1 * | 11/2020 | Blackburn | H01R 12/79 |
| 2022/0021137 | A1 * | 1/2022 | Rita | H01R 12/53 |
| 2022/0140505 | A1 * | 5/2022 | Ayzenberg | H01R 13/6594 174/255 |
| 2022/0271476 | A1 * | 8/2022 | Rossman | H01R 13/6589 |
| 2022/0302652 | A1 * | 9/2022 | Patel | H01R 13/405 |
| 2023/0369784 | A1 | 11/2023 | Hamner et al. | |

* cited by examiner

*Primary Examiner* — Abdullah A Riyami
*Assistant Examiner* — Nelson R. Burgos-Guntin

(57) ABSTRACT

A cable card assembly includes cables terminated to a circuit card and a cable yoke that holds the cables in fixed positions relative to each other. The cable yoke includes cable troughs at spaced apart positions receiving the corresponding cables. The cable yoke is electrically connected to the cable shields of the cables. The cable card assembly includes a ground bus coupled to the ground plane of the circuit card. The ground bus has cable pockets receiving the cable yoke and the corresponding cables. The cable yoke positions the cables in the cable pockets relative to the ground bus. The ground bus is electrically connected to the cable yoke to electrically connect the cable shields of the cables to the ground plane of the circuit card.

20 Claims, 11 Drawing Sheets

CABLE CARD ASSEMBLY OF AN ELECTRICAL CONNECTOR

BACKGROUND OF THE INVENTION

The subject matter herein relates generally to electrical connectors.

Electrical connectors are typically used to electrically couple various types of electrical devices to transmit signals between the devices. At least some known electrical connectors include a cable assembly having cables connected between the electrical device and the electrical connector. The cables each have a signal conductor or a differential pair of signal conductors surrounded by a shield layer that, in turn, is surrounded by a cable jacket. The shield layer includes a conductive foil, which functions to shield the signal conductor(s) from electromagnetic interference (EMI) and generally improve performance. A drain wire may be provided within the cable, electrically connected to the conductive foil. At an end of the communication cable, the cable jacket, the shield layer, and insulation that covers the signal conductor(s) may be removed (e.g., stripped) to expose the signal conductor(s) and the drain wire. The exposed portions of the signal conductor(s) are then mechanically and electrically coupled (e.g., soldered) to corresponding conductors, such as signal pads of a circuit card.

However, signal integrity and electrical performance of the electrical connectors are negatively impacted at the interface between the cables and the circuit card. For example, as the exposed portions of the signal conductors transition to the circuit card, the exposed portions are exposed to air, which affects signal integrity and detrimentally affects performance. Some known electrical connectors include a shield to provide shielding around the exposed conductors and the termination of the signal conductors at the circuit card. Current designs require individual pair stripping, termination, drain wire routing, and soldering. Variations with regard to assembly processes and placement result in a lack of ground field consistency between differential pairs and the shield element perimeter causing unacceptable signal integrity fluctuations. Soldering the cable shield and drain wires to the shield element in the final assembly may be difficult and lead to an unreliable guaranteed ground path. Additionally, the termination between the signal conductors and the signal pads of the circuit card are areas of high stress and potential failure.

Accordingly, there is a need for an electrical connector having an improved connection interface with a circuit card.

BRIEF DESCRIPTION OF THE INVENTION

In one embodiment, a cable card assembly for an electrical connector is provided and includes a circuit card that has an upper surface and a lower surface. The circuit card has a cable end and a mating end opposite the cable end. The circuit card has mating conductors at the mating end for mating with a mating electrical connector. The circuit card has circuit conductors at the cable end. The circuit card has a ground plane. The cable card assembly includes cables terminated to the circuit card. The cables include signal conductors and cable shields surrounding the corresponding signal conductors to provide electrical shielding for the signal conductors. The cable card assembly includes a cable yoke holding the cables in fixed positions relative to each other. The cable yoke includes cable troughs at spaced apart positions receiving the corresponding cables. The cable yoke is electrically connected to the cable shields. The cable card assembly includes a ground bus coupled to the ground plane of the circuit card. The ground bus has cable pockets receiving the cable yoke and the corresponding cables. The cable yoke positions the cables in the cable pockets relative to the ground bus. The ground bus is electrically connected to the cable yoke to electrically connect the cable shields of the cables to the ground plane of the circuit card.

In another embodiment, a cable card assembly for an electrical connector is provided and includes a circuit card that has an upper surface and a lower surface. The circuit card has a cable end and a mating end opposite the cable end. The circuit card has mating conductors at the mating end for mating with a mating electrical connector. The circuit card has circuit conductors at the cable end. The circuit card has a ground plane. The cable card assembly includes cables terminated to the circuit card. The cables include signal conductors and cable shields surrounding the corresponding signal conductors to provide electrical shielding for the signal conductors. The cable card assembly includes a cable yoke holding the cables in fixed positions relative to each other. The cable yoke includes an inner yoke member and an outer yoke member coupled to the inner yoke member. The inner yoke member includes inner cable troughs receiving the corresponding cables. The outer yoke member includes outer cable troughs receiving the corresponding cables. The inner yoke member includes inner connecting walls between the inner cable troughs. The outer yoke member includes outer connecting walls between the outer cable troughs. The inner connecting walls are laser welded to the outer connecting walls to form the cable yoke. The cable yoke is electrically connected to the cable shields. The cable card assembly includes a ground bus coupled to the ground plane of the circuit card. The ground bus has cable pockets receiving the cable yoke and the corresponding cables. The cable yoke positions the cables in the cable pockets relative to the ground bus. The ground bus is electrically connected to the cable yoke to electrically connect the cable shields of the cables to the ground plane of the circuit card.

In a further embodiment, an electrical connector is provided and includes a housing that has walls forming a cavity. The housing has a mating end at a front of the housing configured to be mated with a mating electrical connector. The electrical connector includes a cable card assembly received in the cavity of the housing. The cable card assembly includes a circuit card, cables terminated to the circuit card, a cable yoke holding the cables, and a ground bus providing shielding for the cables. The circuit card has an upper surface and a lower surface. The circuit card has a cable end and a mating end opposite the cable end. The circuit card has mating conductors at the mating end for mating with the mating electrical connector. The circuit card has circuit conductors at the cable end. The circuit card has a ground plane and the ground bus is coupled to the ground plane. The cables include signal conductors and cable shields surrounding the corresponding signal conductors to provide electrical shielding for the signal conductors. The cable yoke includes cable troughs receiving the corresponding cables and holding the cables in fixed positions relative to each other. The cable yoke is electrically connected to the cable shields. The ground bus has cable pockets receiving the cable yoke and the corresponding cables. The cable yoke positions the cables in the cable pockets relative to the ground bus. The ground bus is electrically connected to the cable yoke to electrically connect the cable shields of the cables to the ground plane of the circuit card.

DETAILED DESCRIPTION OF THE INVENTION

Figure 1:
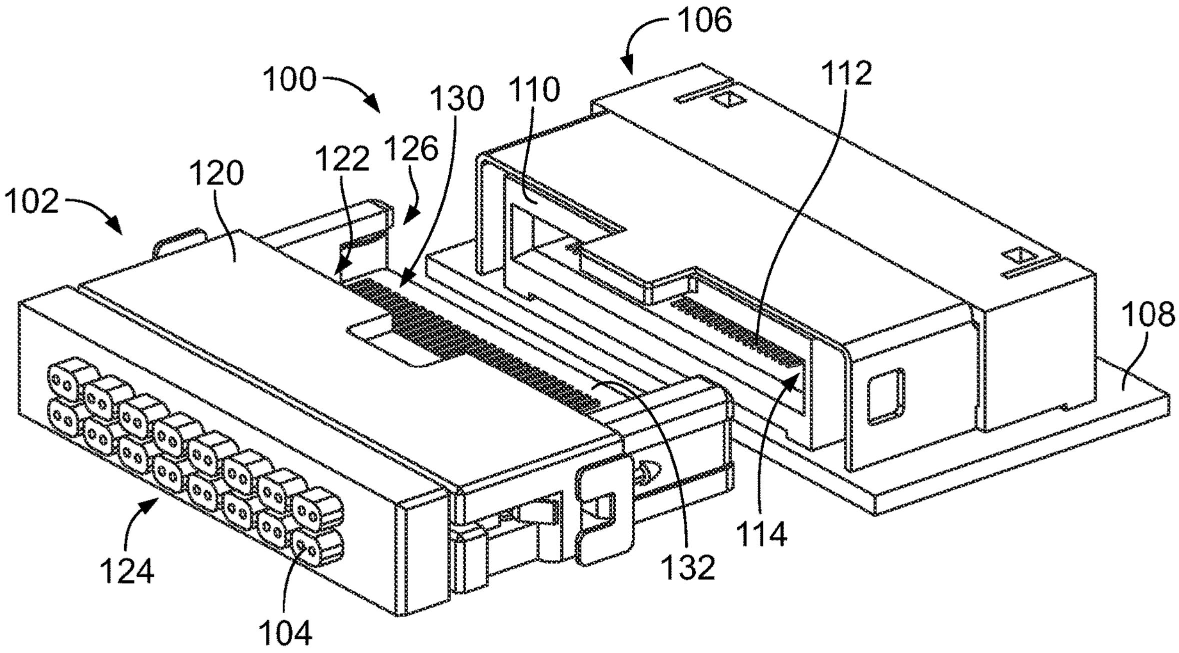
FIG. 1 is a perspective view of a communication system in accordance with an exemplary embodiment.

FIG. 1 is a perspective view of a communication system 100 in accordance with an exemplary embodiment. The communication system 100 includes a first electrical connector 102 provided at ends of cables 104 and a second electrical connector 106 mounted to a circuit board 108. In other various embodiments, the second electrical connector 106 may be provided at ends of cables (not shown). In an exemplary embodiment, the second electrical connector 106 is a receptacle connector, and may be referred to herein after as a receptacle connector 106. The first electrical connector 102 is mated to the second electrical connector 106. In an exemplary embodiment, the first electrical connector 102 is a plug connector, and may be referred to herein after as a plug connector 102. The plug connector 102 is configured to be pluggably coupled to the receptacle connector 106. For example, a portion of the plug connector 102 may be plugged into a receptacle of the receptacle connector 106. In an exemplary embodiment, the plug connector 102 is coupled to the receptacle connector 106 at a separable interface. For example, the plug connector 102 is latchably coupled to the receptacle connector 106. The connectors 102, 106 may be input-output (I/O) connectors.

The receptacle connector 106 includes a receptacle housing 110 holding an array of contacts 112. In an exemplary embodiment, the receptacle housing 110 includes a card slot 114 forming the receptacle receiving the plug connector 102. The contacts 112 may have separable mating interfaces. The contacts 112 may define a compressible interface, such as including deflectable spring beams that are compressed when the plug connector 102 is received in the card slot 114. Optionally, the contacts 112 may be arranged in multiple rows along the top and the bottom of the card slot 114. In various embodiments, the receptacle connector 106 is a communication device, such as a card edge socket connector. However, the receptacle connector 106 may be another type of electrical connector in an alternative embodiment. The receptacle connector 106 may be a high-speed connector.

The plug connector 102 includes a housing 120 having a cavity 122 that receives a cable card assembly 130. The housing 120 has a cable end 124 and a mating end 126 opposite the cable end 124. The cables 104 extend from the cable end 124. The mating end 126 is configured to be coupled to the receptacle connector 106. The cable card assembly 130 includes a circuit card 132. The cables 104 are configured to be terminated to the circuit card 132. The circuit card 132 is configured to be plugged into the card slot 114 when the plug connector 102 is mated with the receptacle connector 106.

Figure 2:
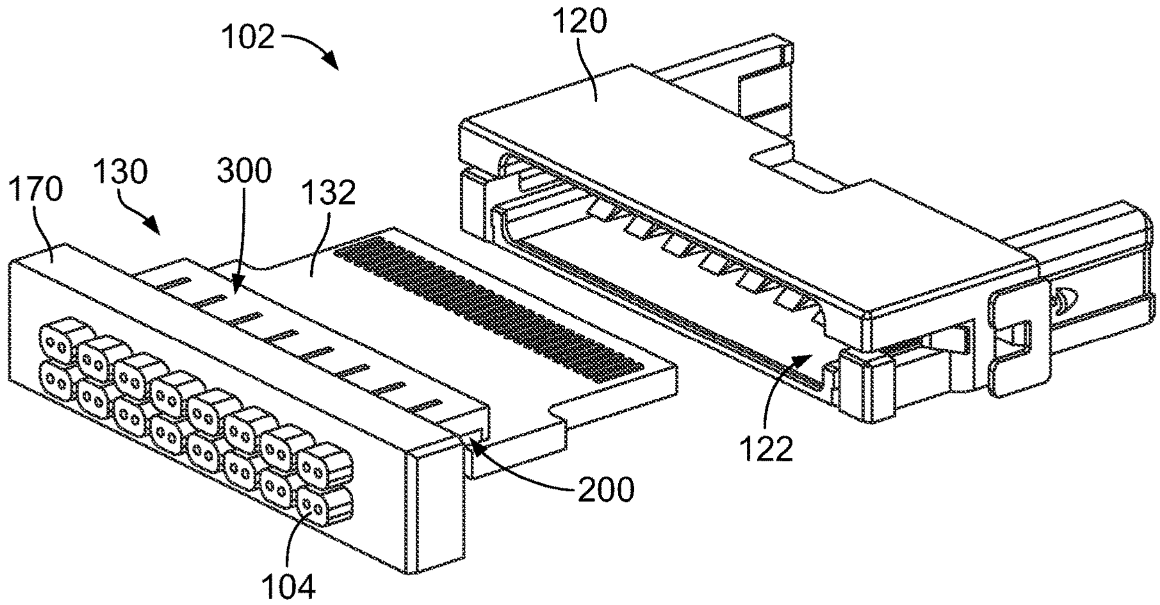
FIG. 2 is an exploded view of the first electrical connector in accordance with an exemplary embodiment.

FIG. 2 is an exploded view of the plug connector 102 in accordance with an exemplary embodiment. The plug connector 102 includes the housing 120 and the cable card assembly 130. The housing 120 receives the cable card assembly 130 in the cavity 122 to hold the circuit card 132 and the cables 104. In an exemplary embodiment, the cable card assembly 130 includes a cable termination 200 where the cables 104 are terminated to the circuit card 132. For example, the conductors of the cables 104 may be terminated directly to the circuit card 132, such as by soldering the conductors to pads or circuits of the circuit card 132. In other various embodiments, the cable termination 200 may include a contact array of contacts used to electrically connect the cable conductors and the circuit card 132. For example, ends of the contacts may be soldered to circuits of the circuit card 132 and the cable conductors may be soldered to opposite ends of the contacts.

In an exemplary embodiment, the cable card assembly 130 includes a ground bus 300 providing shielding for the cable termination 200. The ground bus 300 is coupled to the cables 104, such as cables shields of the cables 104. The ground bus 300 is coupled to the circuit card 132. For example, the ground bus 300 is electrically connected to circuits or conductors of the circuit card 132, such as to a ground plane of the circuit card 132. The ground bus 300 provides electrical shielding for the signal conductors of the cables 104. The ground bus 300 is electrically connected to the shield structures of the cables 104, such as to cable shields of the cables 104 and/or drain wires of the cables 104. In an exemplary embodiment, the ground bus 300 is soldered to the cable shields. However, the ground bus 300 may be electrically connected to the shield structures of the cables 104 by other means in alternative embodiments, such as soldering to the drain wire, welding to the drain wire, press-fitting the drain wire into a compliant feature of the ground bus 300, using conductive adhesive, using a conductive tape or braid, using a conductive gasket, conductive foam, conductive epoxy, and the like. The ground bus 300 may be coupled to the circuit card 132 at a solderless connection, such as at an interference or press-fit connection. In various embodiments, multiple ground buses 300 may be provided, such as at top and/or at the bottom sides of the circuit card 132. The multiple ground buses 300 may be offset, such as shifted front-to-rear and/or side-to-side.

During assembly, the cable card assembly 130, including the circuit card 132, the cables 104, and the ground bus 300, may be loaded into the housing 120, such as into a rear of the housing 120. The cable card assembly 130 may be secured in the housing 120 using latches, fasteners or other securing devices. In an exemplary embodiment, the ends of the cables 104 may be surrounded by a strain relief element 170. For example, the strain relief element 170 may be molded or otherwise formed around the cables 104. The strain relief element 170 may be secured to the circuit card 132, such as being molded to the circuit card 132. Optionally, multiple strain relief elements 170 may be provided, such as upper and lower strain relief elements.

Figure 3:
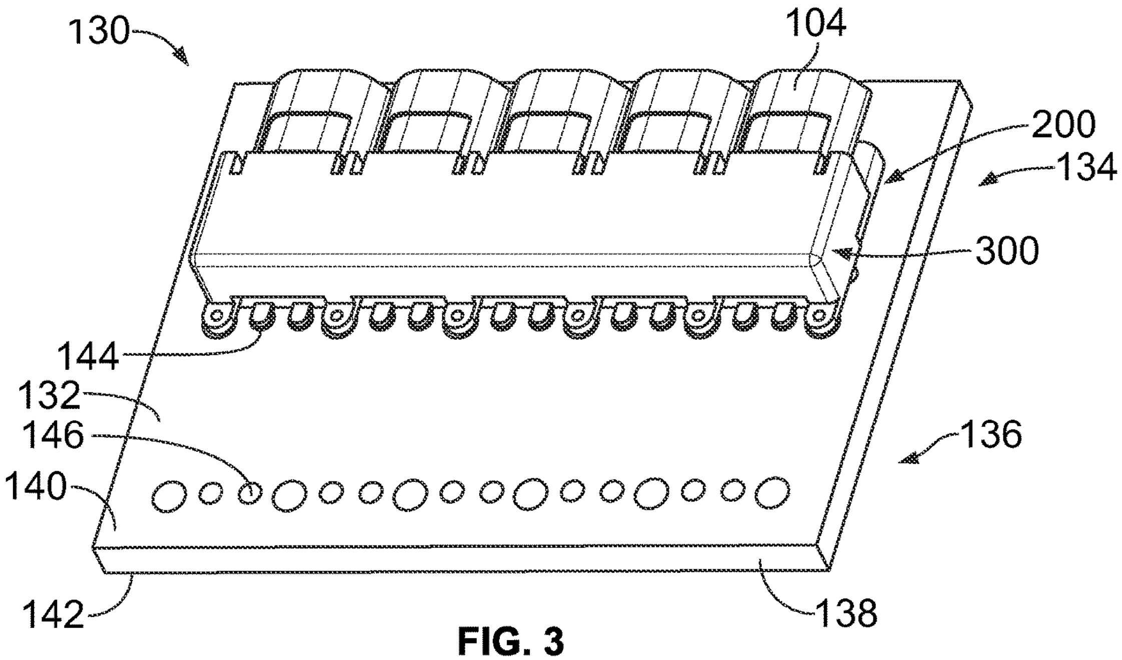
FIG. 3 is a perspective view of a portion of the cable card assembly in accordance with an exemplary embodiment showing a single row of cables.
Figure 4:
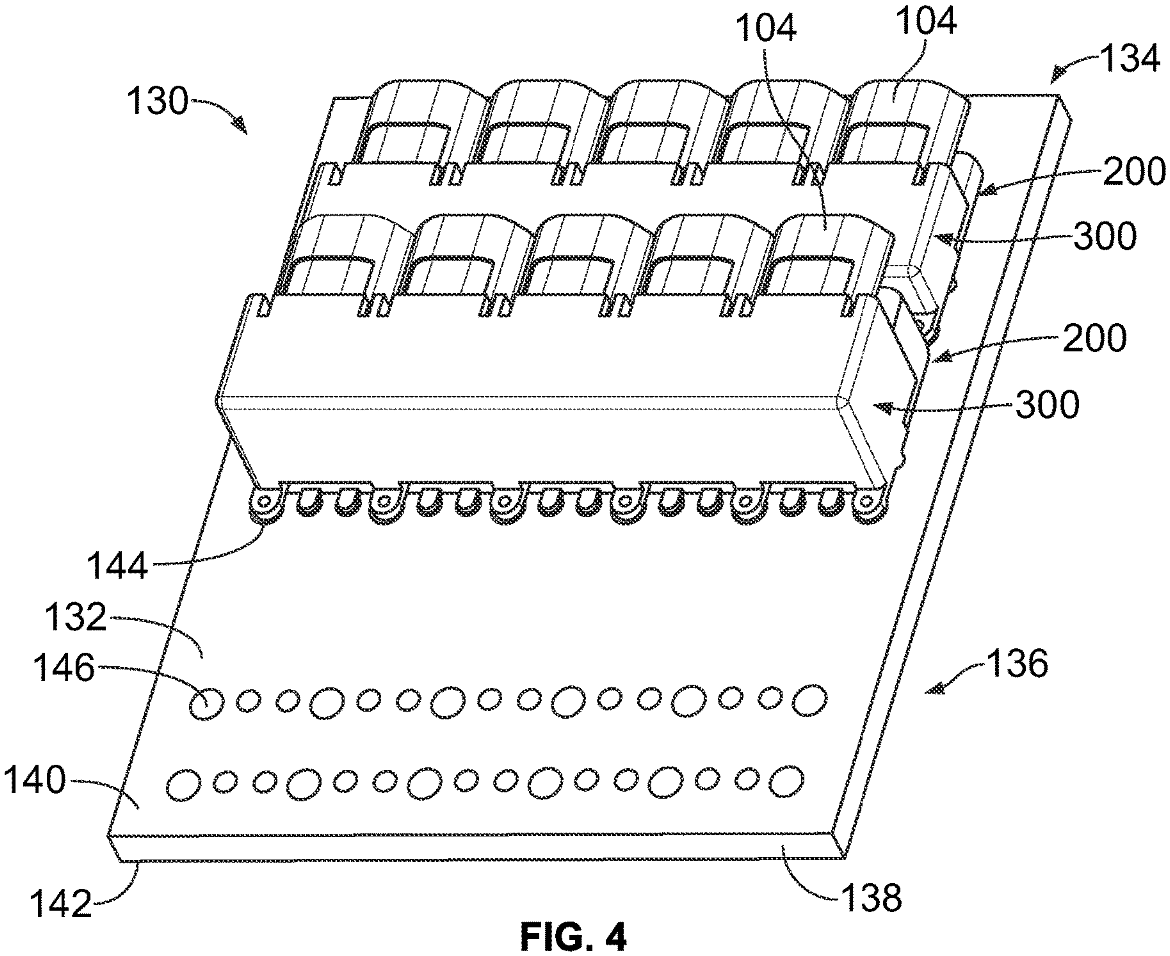
FIG. 4 is a perspective view of a portion of the cable card assembly in accordance with an exemplary embodiment showing two rows of cables.

FIG. 3 is a perspective view of a portion of the cable card assembly 130 in accordance with an exemplary embodiment showing a single row of cables 104. FIG. 4 is a perspective view of a portion of the cable card assembly 130 in accordance with an exemplary embodiment showing two rows of cables 104. More than two rows may be provided in alternative embodiments. The cable card assembly 130 includes the circuit card 132, the cables 104, the cable termination(s) 200 terminated to the circuit card 132, and the corresponding ground bus(es) 300. The cable card assembly 130 may additionally include any number of rows of cables 104 and ground buses 300 on the opposite side of the circuit card 132. The ground buses 300 may be similar for both rows. However, the ground buses 300 may be sized and shaped differently to accommodate the stacking (for example, fly-over) situation.

The circuit card 132 extends between a cable end 134 (for example, rear portion) and a mating end 136 (for example, front portion). The circuit card 132 has a rear edge at the rear of the cable end 134 and the cables 104 are configured to be coupled to the circuit card 132 at the cable end 134 and extend rearward from the circuit card 132. The circuit card 132 has a card edge 138 at the front of the mating end 136 configured to be plugged into the card slot 114 (shown in FIG. 1) of the receptacle connector 106 (shown in FIG. 1). The circuit card 132 includes an upper surface 140 and a lower surface 142. The circuit card 132 may have any reasonable length between the cable end 134 and the mating end 136, depending on the particular application, and may have electrical components mounted to the circuit card 132 between the cable end 134 and the mating end 136. In alternative embodiments, the mating end 136 of the circuit card 132 may be provided at the bottom, such as including an array of mating contacts and/or solder balls, for connection to a circuit board or a socket assembly.

The circuit card 132 includes circuit conductors 144 at the cable end 134 configured to be electrically connected to the cable conductors and/or the ground bus 300. The circuit conductors 144 may be pads or traces of the circuit card 132. In various embodiments, the circuit conductors 144 are provided at the cable end 134 forward of the rear edge of the circuit card 132, such as in the rear half of the circuit card 132. The circuit conductors 144 may be provided at both the upper surface 140 and the lower surface 142. However, the in alternative embodiments, the cable end 134 is defined at the top of the circuit card 132 and the circuit conductors 144 are provided only on the upper surface 140, such as between the front and the rear edges of the circuit card 132. The circuit conductors 144 include both signal conductors and ground conductors. The ground conductors may be electrically connected to a ground plane (not shown) of the circuit card 132. Optionally, the circuit conductors 144 may be arranged in a ground-signal-signal-ground arrangement. The lengths and/or widths of the signal conductors may be different than the ground conductors. The positioning of the signal conductors on the circuit card 132 (for example, depth from the rear edge of the circuit card 132) may be different than the ground conductors. The spacing between the signal conductors (i.e., pitch) may be different than the spacing between the signal conductors and the ground conductors.

The circuit card 132 includes mating conductors 146 at the mating end 136 configured to be electrically connected to corresponding contacts 112 (shown in FIG. 1) of the receptacle connector 106. The mating conductors 146 are electrically connected to corresponding circuit conductors 144 through traces, vias or other circuits of the circuit card 132. The mating conductors 146 include both signal conductors and ground conductors. The ground conductors may be electrically connected to a ground plane (not shown) of the circuit card 132. The mating conductors 146 may be pads or traces of the circuit card 132. The mating conductors 146 may be provided at both the upper surface 140 and the lower surface 142. The mating conductors 146 are provided proximate to the card edge 138. However, in alternative embodiments, the mating end 136 is defined by the bottom of the circuit card 132 and the mating conductors 146 are provided only on the lower surface 142, such as for mating with socket contacts of a socket connector or connection to a circuit board.

The cable termination 200 provides an electrical interface between the cables 104 and the circuit card 132. The ground bus 300 is terminated to the cables 104 and the circuit card 132. The ground bus 300 provides electrical shielding for the cable termination 200. The ground bus 300 provides electrical shielding at the interface with the cables 104. The ground bus 300 provides electrical shielding at the interface with the circuit card 132.

Figure 5:
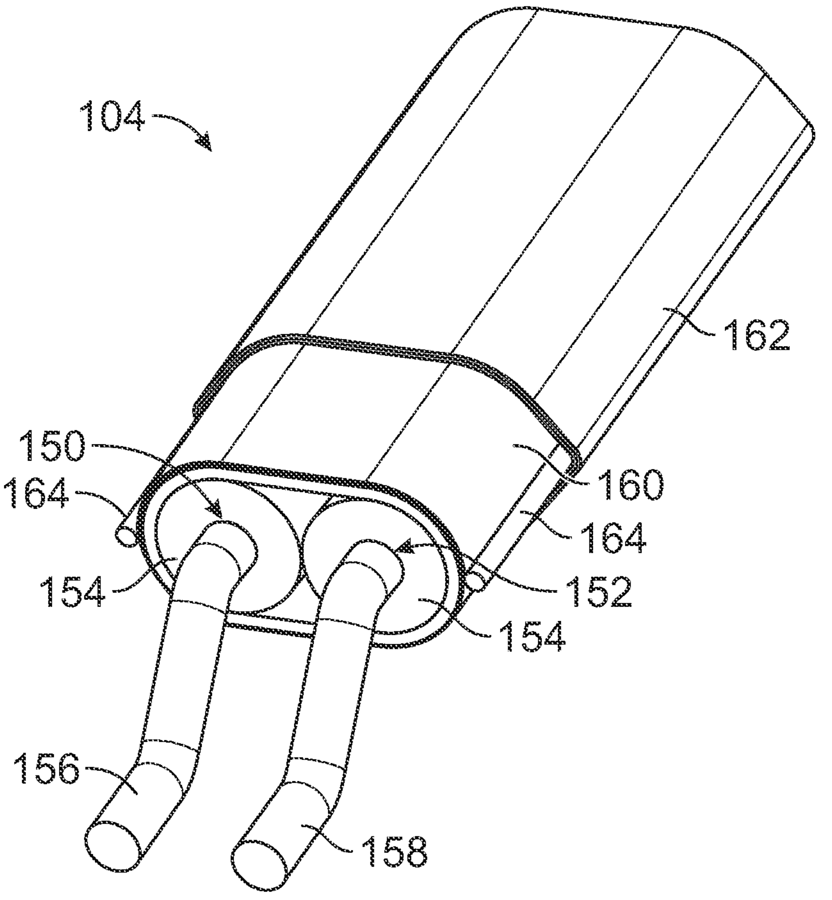
FIG. 5 is a perspective view of one of the cables in accordance with an exemplary embodiment.
Figure 6:
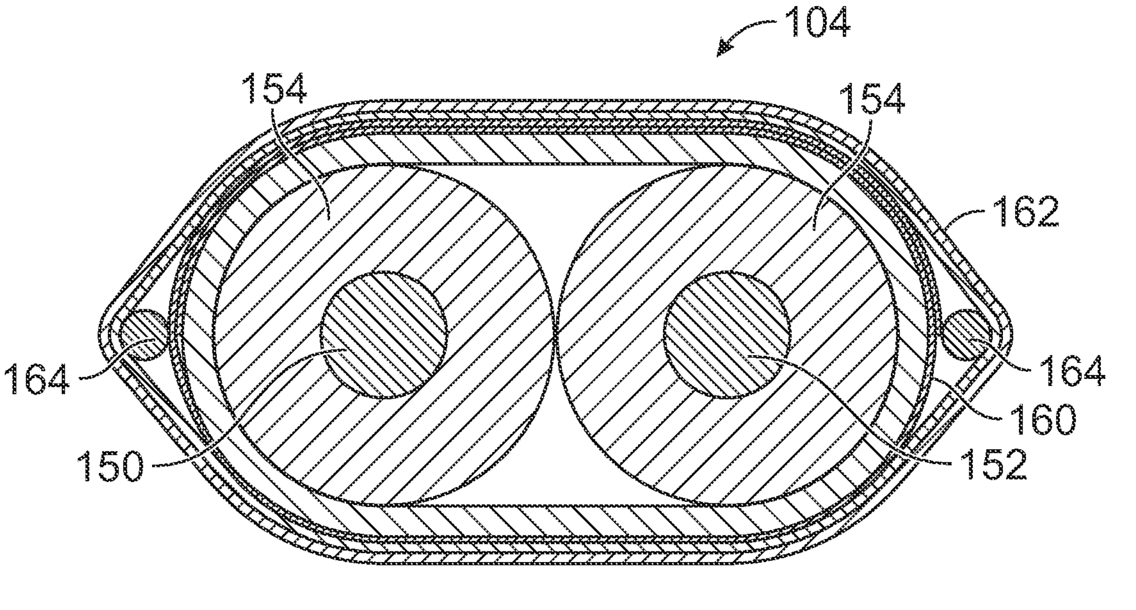
FIG. 6 is a cross sectional view of one of the cables in accordance with an exemplary embodiment.

FIG. 5 is a perspective view of one of the cables 104 in accordance with an exemplary embodiment. FIG. 6 is a cross sectional view of one of the cables 104 in accordance with an exemplary embodiment. Each cable 104 includes at least one signal conductor and a shield structure providing electrical shielding for the at least one signal conductor.

In an exemplary embodiment, the cables 104 are twin-axial cables. For example, each cable 104 includes a first signal conductor 150 and a second signal conductor 152. The signal conductors 150, 152 carry differential signals.

The signal conductors 150, 152 are configured to be electrically connected to corresponding circuit conductors 144 of the circuit card 132 (shown in FIG. 3). Exposed portions of the signal conductors 150, 152 may be terminated directly to the circuit card 132 or to contacts, which are used to electrically connect the signal conductors 150, 152 and the circuit card 132.

The cable 104 includes insulators 154 surrounding the signal conductors 150, 152 and a cable shield 160 surrounding the insulators 154. The cable shield 160 provides circumferential shielding around the signal conductors 150, 152. The cable shield 160 may include multiple shield layers, such as an inner shield (on the insulator) and an outer shield (on the cable jacket). The cable 104 includes a cable jacket 162 surrounding the cable shield 160. In various embodiments, the cable 104 includes one or more drain wires 164 electrically connected to the cable shield 160. For example, drain wires 164 may be provided at both sides of the cable 104. In alternative embodiments, the cable 104 is provided without a drain wire.

In an exemplary embodiment, the cable jacket 162, the cable shield 160, and the insulators 154 may be removed (e.g., stripped) to expose portions of the signal conductors 150, 152, respectively, which are referred to hereinafter as exposed portions 156, 158. The exposed portions 156, 158 of the signal conductors 150, 152 are configured to be mechanically and electrically coupled (e.g., soldered) to corresponding circuit conductors 144 of the circuit card 132 or to corresponding signal contacts (not shown). The exposed portions 156, 158 may be bent, such as bent inward toward each other (distance between reduced for tighter coupling and smaller trace spacing) and/or may be bent toward the circuit card 132. The ground bus 300 extends along the exposed portions 156, 158 and provides shielding for the exposed portions 156, 158. The ground bus 300 is shaped and positioned relative to the exposed portions 156, 158 to control impedance along the signal paths. For example, the ground bus 300 may be shaped and positioned relative to the exposed portions 156, 158 to maintain a target impedance along the signal paths (for example, 50 Ohms, 75 Ohms, 100 Ohms, and the like).

Figure 7:
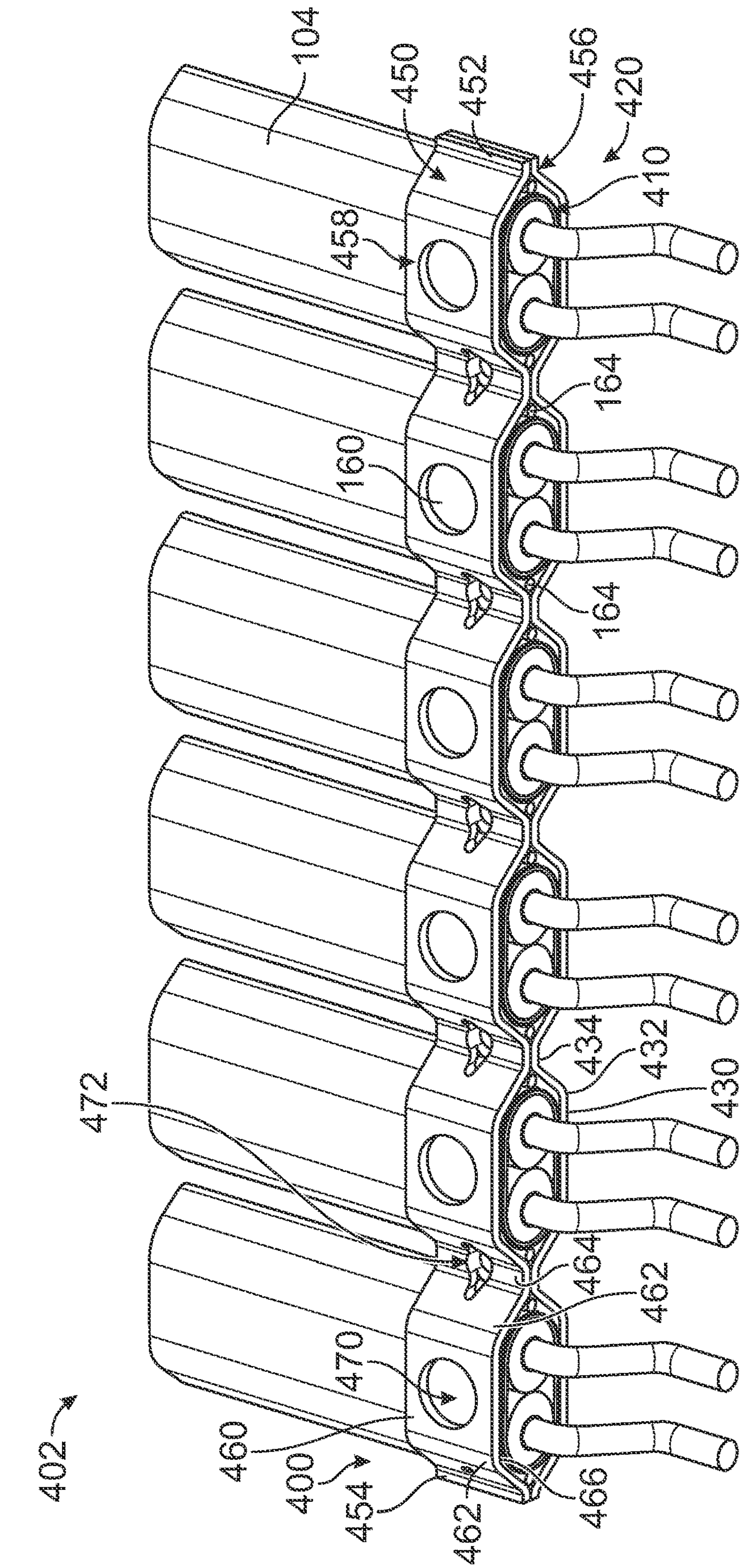
FIG. 7 is a front perspective view of a portion of the cable card assembly in accordance with an exemplary embodiment showing a cable assembly in accordance with an exemplary embodiment.

FIG. 7 is a front perspective view of a portion of the cable card assembly 130 in accordance with an exemplary embodiment showing a cable assembly in accordance with an exemplary embodiment. FIG. 7 shows an array of the cables 104 (for example, six cables) arranged in a row. In an exemplary embodiment, the cable card assembly 130 includes a cable yoke 400 holding the cables 104 in fixed positions relative to each other. The cable yoke 400 holds the cables 104 together in a cable assembly 402. The cable assembly 402 may be assembled into the ground bus 300 (FIG. 3).

The cable yoke 400 includes one or more yoke members configured to be mechanically and electrically connected to the cables 104. For example, in the illustrated embodiment, the cable yoke 400 includes an inner yoke member 420 and an outer yoke member 450. The outer yoke member 450 is separate and discrete from the inner yoke member 420 and coupled thereto. For example, the outer yoke member 450 may be laser welded or soldered to the inner yoke member 420. Optionally, the inner yoke member 420 and the outer yoke member 450 may be identical to each other and inverted 180°. However, the inner and outer yoke members 420, 450 may have different features. In an exemplary embodiment, the yoke members 420, 450 may be stamped and formed from one or more metal sheets. However, the yoke members 420, 450 may be die cast, additive manufactured or otherwise manufactured to form the cable yoke 400.

In an exemplary embodiment, the cables 104 are held in cable troughs 410. The yoke members 420, 450 define the cable troughs 410. In an exemplary embodiment, the yoke members 420, 450 completely surround the cables 104. For example, the yoke members 420, 450 provide 360° shielding around each cable 104. The cables 104 may be sandwiched between the inner and outer yoke members 420, 450, such as to mechanically hold the cables 104 in the cable troughs 410. In an exemplary embodiment, the inner and outer yoke members 420, 450 are electrically connected to the cables 104, such as the cable shields 160 and/or the drain wires 164. For example, the inner and outer yoke members 420, 450 may be soldered to the cable shields 160 and/or the drain wires 164 in the cable troughs 410. The inner and outer yoke members 420, 450 may be soldered to the cable shields 160 and/or soldered or laser welded to the drain wires 164.

Figure 8:
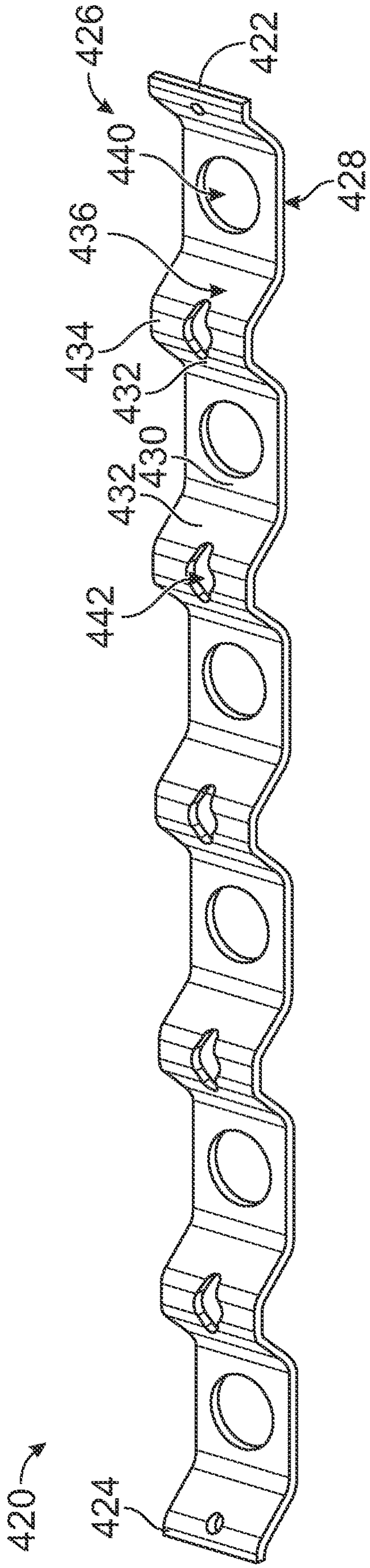
FIG. 8 is a perspective view of the inner yoke member in accordance with an exemplary embodiment.
Figure 9:
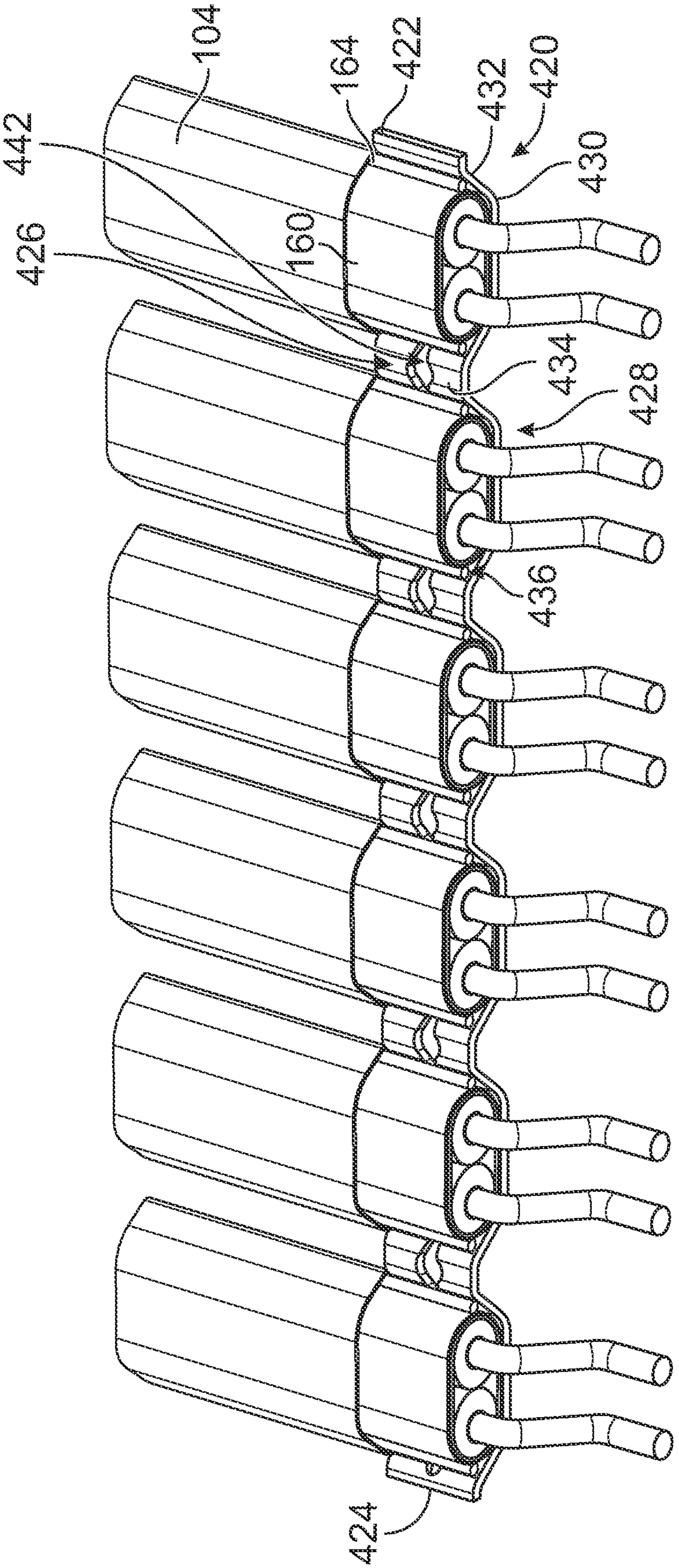
FIG. 9 is a perspective view of a portion of the cable card assembly showing the cables arranged in the inner yoke member in accordance with an exemplary embodiment.

FIG. 8 is a perspective view of the inner yoke member 420 in accordance with an exemplary embodiment. FIG. 9 is a perspective view of a portion of the cable card assembly 130 showing the cables 104 arranged in the inner yoke member 420.

In an exemplary embodiment, the inner yoke member 420 is stamped and formed from a metal sheet. The inner yoke member 420 extends between a first end 422 and a second end 424. The inner yoke member 420 extends between an inner end 426 and an outer end 428. In various embodiments, the inner yoke member 420 is oriented such that the inner end 426 defines a top of the inner yoke member 420 and the outer end 428 defines a bottom of the inner yoke member 420.

In an exemplary embodiment, the inner yoke member 420 includes an end wall 430, side walls 432 extending from the end wall 430, and connecting walls 434 extending between the side walls 432. The end wall 430 and the side walls 432 define an inner cable trough 436, which forms an inner portion of the cable trough 410 with the outer yoke member 450 (FIG. 7). The end walls 430 define the outer end 428. The end walls 430 may be co-planer with each other. The end walls 430 may define bottom walls of the inner cable troughs 436.

The side walls 432 extend from opposite sides of the end walls 430. Optionally, the side walls 432 are angled from the end walls 430, such as at an angle of between 30° and 60°. In various embodiments, the side walls 432 may be angled at approximately 45° relative to the end walls 430. In the illustrated embodiment, the side walls 432 in the end walls 430 form trapezoidal shaped inner cable troughs 436. The side walls 432 may extend at other angles in alternative embodiments to form different shaped inner cable troughs 436, such as extending perpendicular to the end walls 430 to form rectangular shaped inner cable troughs 436. In other various embodiments, the side walls 432 may be curved, such as to follow a curvature of the cable 104.

The connecting walls 434 are provided at the inner end 426. The connecting walls 434 space the side walls 432 apart from each other to control spacing of the cables 104. For example, lengths of the connecting walls 434 define the spacing between the inner cable troughs 436. In an exemplary embodiment, the connecting walls 434 provide surfaces for connecting the inner yoke member 420 to the outer yoke member 450. For example, the connecting walls 434 may be welded or soldered to the outer yoke member 450.

In an exemplary embodiment, the inner yoke member 420 includes solder openings 440 in the end walls 430. The solder openings 440 are used for soldering the cable shields 160 of the cables 104 to the inner yoke member 420. In the illustrated embodiment, the solder openings 440 are circular. The solder openings 440 may have other shapes in alternative embodiments. Optionally, multiple solder openings 440 may be provided on each end wall 430.

In an exemplary embodiment, the inner yoke member 420 includes openings 442 along the side walls 432 and/or the connecting walls 434. The openings 442 may be used for laser welding the inner yoke member 420 to the outer yoke member 450 and/or for laser welding the drain wires 164 to the inner and/or outer yoke members 420, 450. In the illustrated embodiment, the openings 442 extend entirely across the connecting walls 434 into the corresponding side walls 432. In alternative embodiments, separate openings 442 may be provided on both side walls 432 with the connecting walls 434 extending between separate openings 442 in the side walls 432. Optionally, multiple openings 442 may be provided in the side walls 432 and/or the connecting walls 434.

Returning to FIG. 7, the outer yoke member 450 is shown coupled to the inner yoke member 420. The outer yoke member 450 may be similar to the inner yoke member 420. Optionally, the outer yoke member 450 may be identical to the inner yoke member 420. In an exemplary embodiment, the outer yoke member 450 is stamped and formed from a metal sheet. The outer yoke member 450 extends between a first end 452 and a second end 454. The outer yoke member 450 extends between an inner end 456 and an outer end 458. In various embodiments, the outer yoke member 450 is oriented such that the inner end 456 defines a bottom of the outer yoke member 450 and the outer end 458 defines a top of the outer yoke member 450.

In an exemplary embodiment, the outer yoke member 450 includes an end wall 460, side walls 462 extending from the end wall 460, and connecting walls 464 extending between the side walls 462. The end wall 460 and the side walls 462 define an outer cable trough 466, which forms an outer portion of the cable trough 410 with the inner yoke member 420. The end walls 460 define the outer end 458. The end walls 460 may be co-planer with each other. The end walls 460 may define top walls of the outer cable troughs 466.

The side walls 462 extend from opposite sides of the end walls 460. Optionally, the side walls 462 are angled from the end walls 460, such as at an angle of between 30° and 60°. In various embodiments, the side walls 462 may be angled at approximately 45° relative to the end walls 460. In the illustrated embodiment, the side walls 462 in the end walls 460 form trapezoidal shaped outer cable troughs 466. The side walls 462 may extend at other angles in alternative embodiments to form different shaped outer cable troughs 466, such as extending perpendicular to the end walls 460 to form rectangular shaped outer cable troughs 466. In other various embodiments, the side walls 462 may be curved, such as to follow a curvature of the cable 104.

The connecting walls 464 are provided at the inner end 456. The connecting walls 464 space the side walls 462 apart from each other to control spacing of the cables 104. For example, lengths of the connecting walls 464 define the spacing between the outer cable troughs 466. In an exemplary embodiment, the connecting walls 464 provide surfaces for connecting the outer yoke member 450 to the inner yoke member 420. For example, the connecting walls 464 of the outer yoke member 450 may be welded or soldered to the connecting walls 434 of the inner yoke member 420.

In an exemplary embodiment, the outer yoke member 450 includes solder openings 470 in the end walls 460. The solder openings 470 are used for soldering the cable shields 160 of the cables 104 to the outer yoke member 450. In the illustrated embodiment, the solder openings 470 are circular. The solder openings 470 may have other shapes in alternative embodiments. Optionally, multiple solder openings 470 may be provided on each end wall 460.

In an exemplary embodiment, the outer yoke member 450 includes openings 472 along the side walls 462 and/or the connecting walls 464. The openings 472 may be used for laser welding the outer yoke member 450 to the inner yoke member 420 and/or for laser welding the drain wires 164 to the outer and/or inner yoke members 450, 420. In the illustrated embodiment, the openings 472 extend entirely across the connecting walls 464 into the corresponding side walls 462. In alternative embodiments, separate openings 472 may be provided on both side walls 462 with the connecting walls 464 extending between separate openings 472 in the side walls 462. Optionally, multiple openings 472 may be provided in the side walls 462 and/or the connecting walls 464.

When assembled, the connecting walls 464 of the outer yoke member 450 are seated on the connecting walls 434 of the inner yoke member 420. The connecting walls 464 of the outer yoke member 450 may be laser welded to the connecting walls 434 of the inner yoke member 420 to form the cable yoke 400. The cables 104 are captured in the cable troughs 410 between the inner yoke member 420 and the outer yoke member 450. For example, the end walls 430, 460 extend along opposite ends of each cable trough 410 and may compress or hold the cables 104 in the cable troughs 410 by an interference fit. The side walls 432, 462 extend along opposite sides of each cable trough 410. The side walls 432, 462 position the cables 104 in the cable troughs 410. The cable yoke 400 provides 360° shielding around each cable 104 defined by the end walls 430, 460 and the side walls 432, 462. The cable troughs 410 and the cables 104 are separated from each other by the side walls 432, 462.

The drain wires 164 extend into the cable troughs 410, such as at the interface between the inner and outer yoke members 420, 450. In an exemplary embodiment, the drain wires 164 may extend straight forward, such as along the insulators 154, directly into the cable troughs 410. The drain wires 164 are located in pockets formed in the cable troughs 410, such as along the side walls 432, 462. The drain wires 164 may be located adjacent the connecting walls 434, 464. In an exemplary embodiment, the drain wires 164 are located adjacent the openings 442, 472. The connecting walls 434, 464 and/or the side walls 432, 462 may be laser welded to the drain wires 164, such as through the openings 442, 472.

Figure 10:
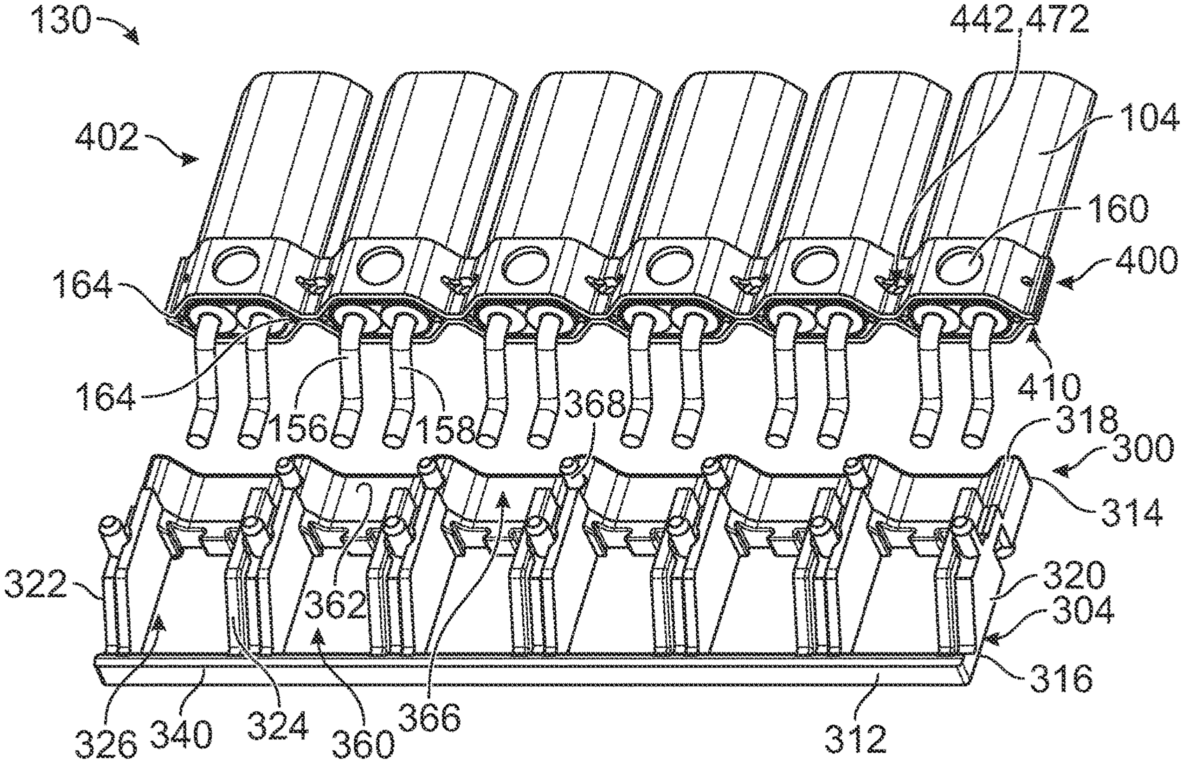
FIG. 10 is a front perspective view of a portion of the cable card assembly in accordance with an exemplary embodiment showing the cable assembly poised for loading into a portion of the ground bus.
Figure 11:
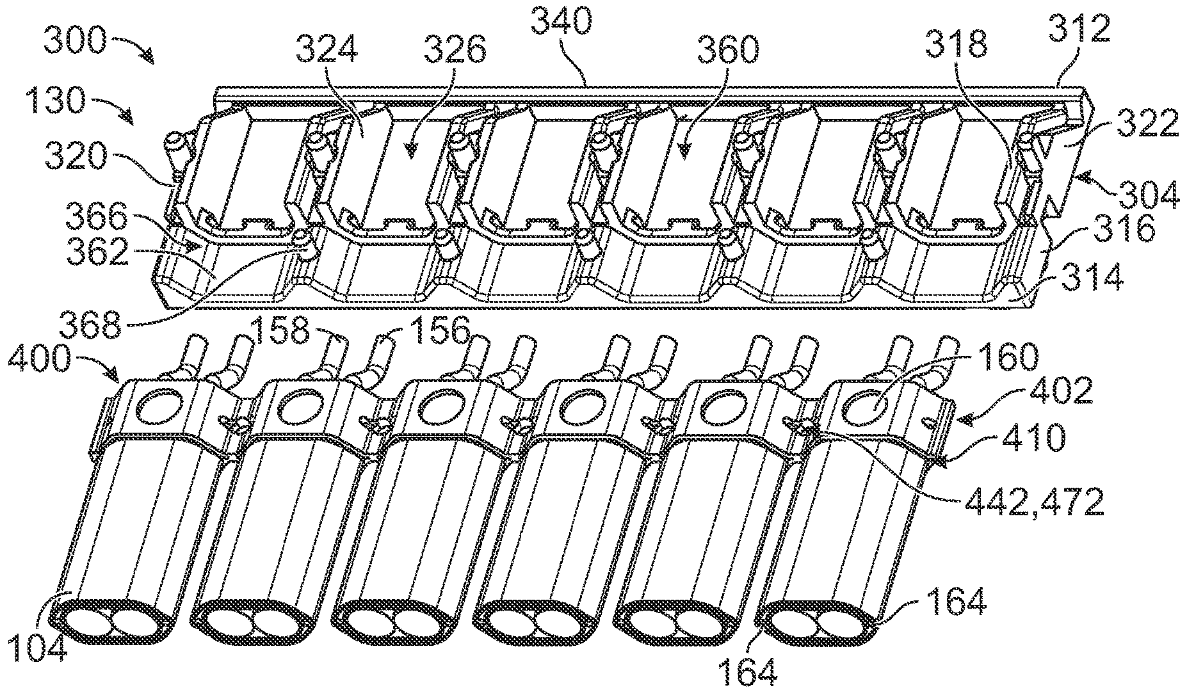
FIG. 11 is a rear perspective view of a portion of the cable card assembly in accordance with an exemplary embodiment showing the cable assembly poised for loading into a portion of the ground bus.
Figure 12:
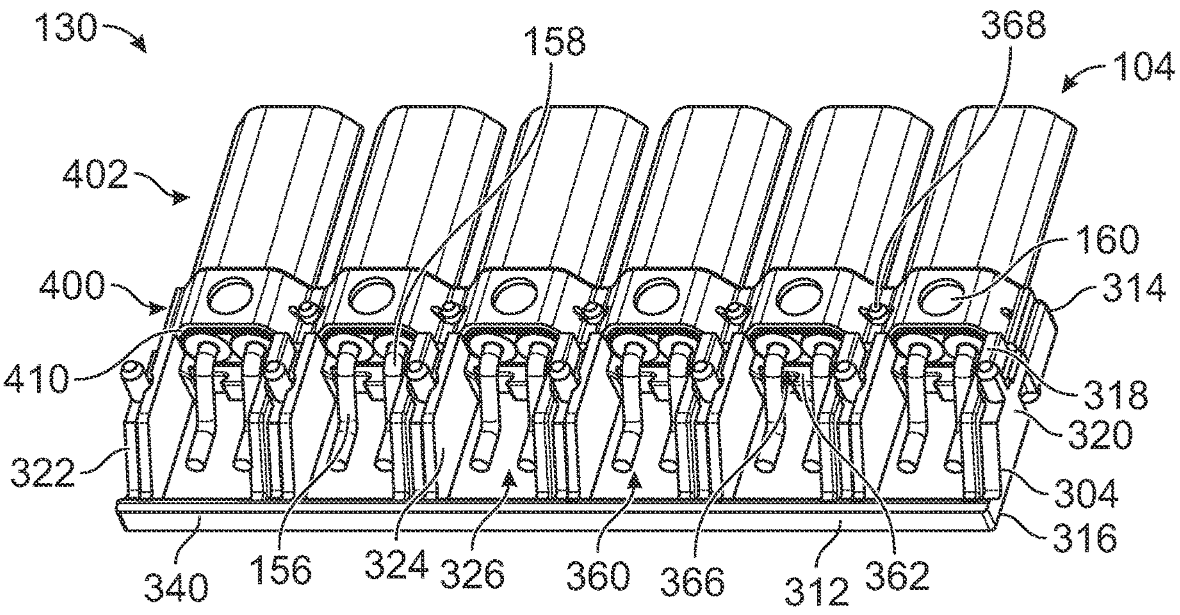
FIG. 12 is a front perspective view of a portion of the cable card assembly in accordance with an exemplary embodiment showing the cable assembly loaded into a portion of the ground bus.
Figure 13:
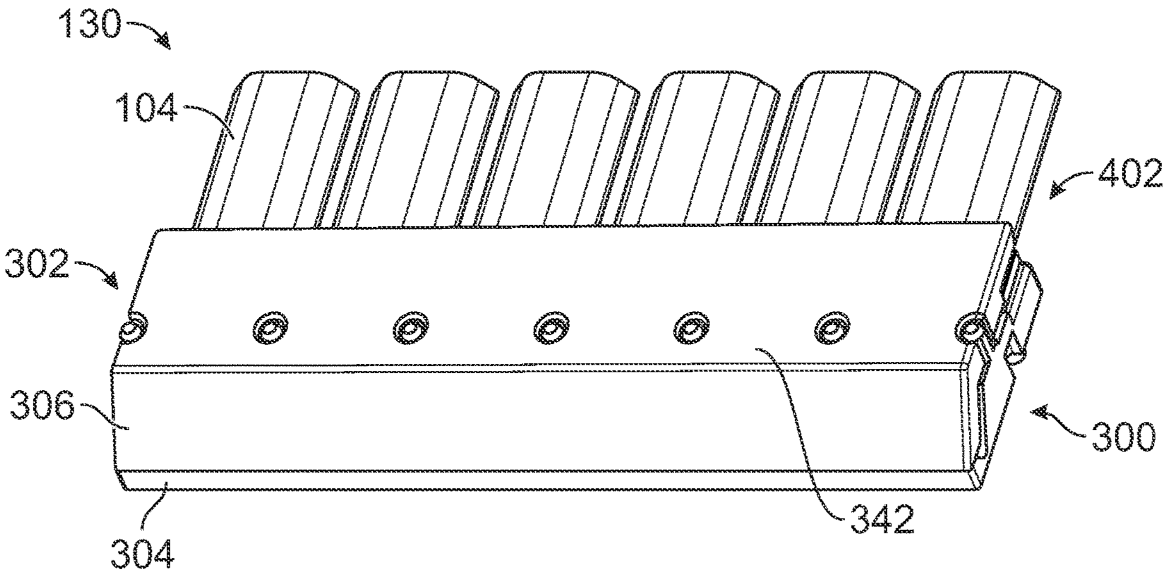
FIG. 13 is a front perspective view of a portion of the cable card assembly in accordance with an exemplary embodiment showing the cable assembly mechanically and electrically connected to the ground bus.

FIG. 10 is a front perspective view of a portion of the cable card assembly 130 in accordance with an exemplary embodiment showing the cable assembly 402 poised for loading into a portion of the ground bus 300. FIG. 11 is a rear perspective view of a portion of the cable card assembly 130 in accordance with an exemplary embodiment showing the cable assembly 402 poised for loading into a portion of the ground bus 300. FIG. 12 is a front perspective view of a portion of the cable card assembly 130 in accordance with an exemplary embodiment showing the cable assembly 402 loaded into a portion of the ground bus 300. FIG. 13 is a front perspective view of a portion of the cable card assembly 130 in accordance with an exemplary embodiment showing the cable assembly 402 mechanically and electrically connected to the ground bus 300.

The ground bus 300 includes a shell 302 (FIG. 13) manufactured from a conductive material, such as a metal material to provide electrical shielding. In various embodiments, the ground bus 300 may be a diecast component. In other various embodiments, the ground bus 300 may be a stamped and formed component. In the illustrated embodiment, the shell 302 of the ground bus 300 is manufactured as a single, unitary component. However, in alternative embodiments, the ground bus 300 may be manufactured from discrete components that are mechanically and electrically connected together.

The ground bus 300 extends between a front 312 and a rear 314. The rear 314 is configured to face the cables 104. The ground bus 300 extends between an inner end 316 and an outer end 318. In various embodiments, the inner end 316 is at the bottom and is configured to face the circuit card 132 (FIG. 3). The inner end 316 may be mounted to the circuit card 132 to mechanically and electrically connect the ground bus 300 to the circuit card 132. The ground bus 300 includes a first side wall 320 and a second side wall 322 extending between the front 312 and the rear 314. In an exemplary embodiment, the ground bus 300 includes divider walls 324 extending parallel to and spaced apart from the side walls 320, 322. The divider walls 324 form cavities 326 between the divider walls 324. The cavities 326 receive the ends of the cables 104. The divider walls 324 provide electrical shielding between the cavities 326, such as for shielding between the cables 104.

In an exemplary embodiment, the ground bus 300 includes a front wall 340 at the front 312 and an outer wall 342 at the outer end 318. The front wall 340, the outer wall 342, the side walls 320, 322, and the divider walls 324 provide electrical shielding for the cavities 326. The front wall 340, the outer wall 342, the side walls 320, 322, and the divider walls 324 form cavities 326 around the exposed portions 156, 158 of the signal conductors 150, 152 of the cables 104.

In an exemplary embodiment, the ground bus 300 is a multipiece structure. The ground bus 300 includes an inner bus member 304 and an outer bus member 306. The inner bus member 304 is located between the outer bus member 306 and the circuit card 132. The cable assembly 402 is received between the inner bus member 304 and the outer bus member 306. For example, the ends of the cables 104 and the cable yoke 400 are received between the inner bus member 304 and the outer bus member 306. In an exemplary embodiment, the inner bus member 304 and the outer bus member 306 are electrically connected to the cable yoke 400 to electrically connect the cable shields 160 of the cables 104 to the ground bus 300, and thus the circuit card 132.

In the illustrated embodiment, the inner bus member 304 is a diecast part forming the majority of the ground bus 300, whereas the outer bus member 306 is a diecast part forming a cover or lid for covering the inner bus member 304. However, in alternative embodiments, the outer bus member 306 may be a stamped and formed part forming a cover or lid for the inner bus member or a diecast part forming a significant portion of the structure of the ground bus 300. In an exemplary embodiment, the inner bus member 304 includes the side walls 320, 322, the divider walls 324, and the front wall 340. The outer bus member 306 includes the outer wall 342. In various embodiments, the outer bus member 306 may be soldered or welded to the inner bus member 304. In alternative embodiments, the outer bus member 306 may be secured to the inner bus member 304 using fasteners, latches, clips, or other securing features.

In an exemplary embodiment, the inner bus member 304 includes openings 360 at the outer end 318 that receive the ends of the cables 104. The inner bus member 304 includes base walls 362 rearward of the openings 360. The base walls 362 span between the divider walls 324 and the side walls 320, 322. The base walls 362 receive and support the cables 104. In an exemplary embodiment, the cavities 326 between the divider walls 324 include cable pockets 366. The cable yoke 400 is received in the cable pockets 366. The base walls 362 form the cable pockets 366. The outer bus member 306 extends along the fourth side of the cable pockets 366 to enclose or surround the cable yoke 400 and the cables 104.

During assembly, the cable yoke 400 holds all of the cables 104 at fixed positions relative to each other. For example, the cable troughs 410 are spaced apart at predetermined spacings to locate the cables 104 relative to each other. The cable yoke 400 is received in the cable pockets 366. All of the cables 104 may be simultaneously loaded into the cable pockets 366 as part of the cable assembly 402. For example, the cable yoke 400 holds the cables 104 at predetermined positions for loading into the ground bus 300. In an exemplary embodiment, the inner bus member 304 includes mounting features, such as mounting posts 368 for mounting the cable yoke 400 to the inner bus member 304. The mounting posts 368 are received in the openings 442, 472. The cable yoke 400 may be press fit on the mounting posts 368 to mechanically and electrically connect the cable yoke 400 to the inner bus member 304. Other types of mounting features may be used in alternative embodiments. Because the drain wires 164 are previously welded, or otherwise electrically coupled to the cable yoke 400, the drain wires 164 do not need to be individually terminated to the ground bus 300. After the cable assembly 402 is coupled to the inner bus member 304 and the exposed portions 156, 158 of the signal conductors 150, 152 are terminated to the circuit card 132, the outer bus member 306 may be coupled to the inner bus member 304.

Figure 14:
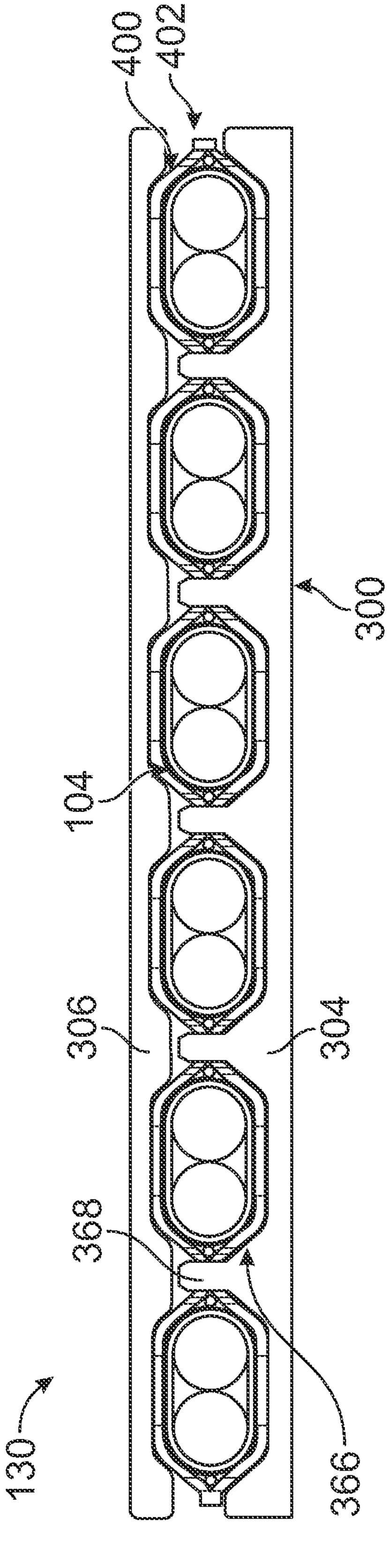
FIG. 14 is a cross sectional view of a portion of the cable card assembly in accordance with an exemplary embodiment showing the cable assembly mechanically and electrically connected to the ground bus.
Figure 15:
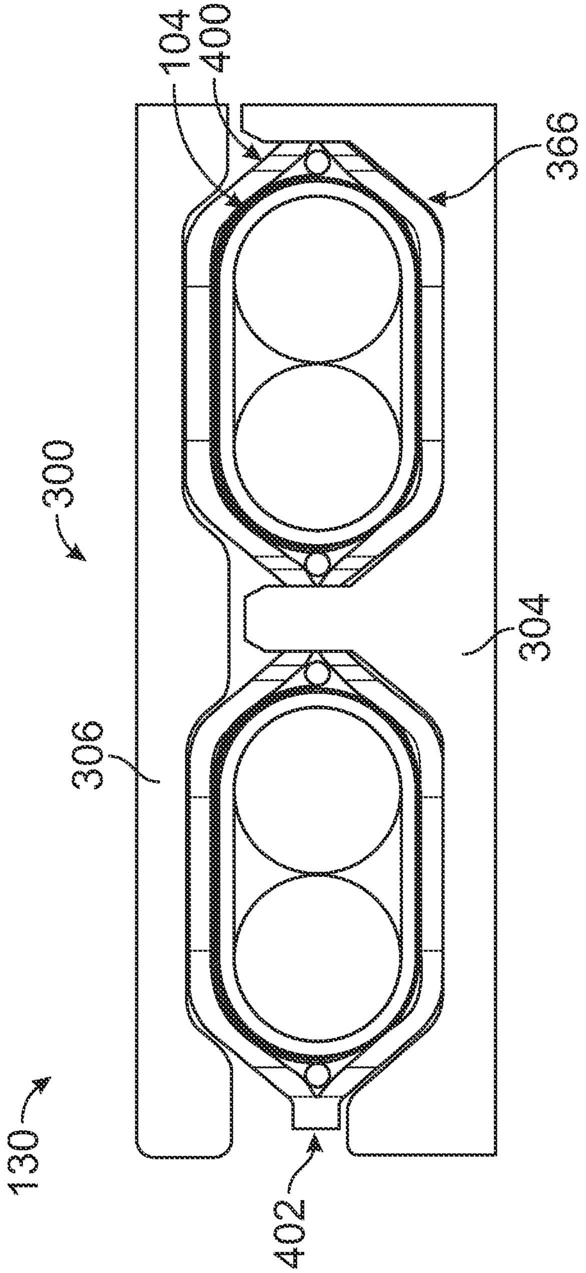
FIG. 15 is an enlarged cross sectional view of a portion of the cable card assembly in accordance with an exemplary embodiment.

FIG. 14 is a cross sectional view of a portion of the cable card assembly 130 in accordance with an exemplary embodiment showing the cable assembly 402 mechanically and electrically connected to the ground bus 300. FIG. 15 is an enlarged cross sectional view of a portion of the cable card assembly 130 in accordance with an exemplary embodiment. The cable yoke 400 holds all of the cables 104 in the ground bus 300. The cable yoke 400 is received in the cable pockets 366. The mounting posts 368, connect the cable yoke 400 to the inner bus member 304. The outer bus member 306 is coupled to the inner bus member 304 to cover the cable assembly 402.

Figure 16:
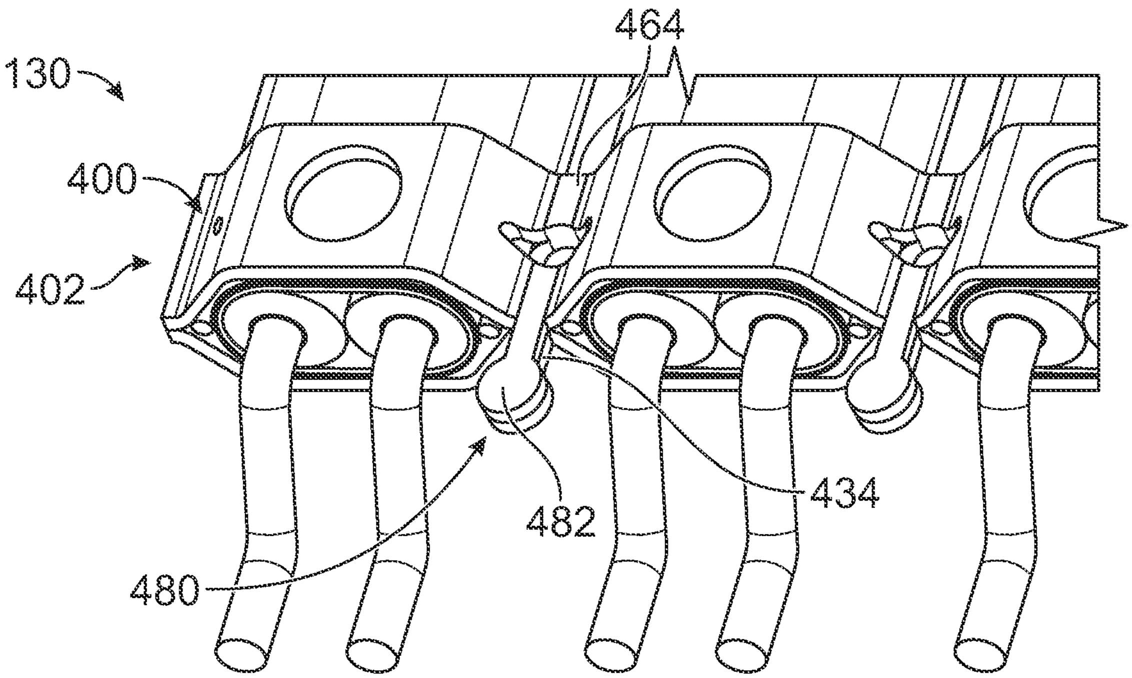
FIG. 16 is a front perspective view of a portion of the cable card assembly in accordance with an exemplary embodiment showing the cable assembly in accordance with an exemplary embodiment.

FIG. 16 is a front perspective view of a portion of the cable card assembly 130 in accordance with an exemplary embodiment showing the cable assembly 402 in accordance with an exemplary embodiment. In an exemplary embodiment, the cable yoke 400 includes retention features 480 used to retain the cable assembly 402 in the ground bus 300 (shown in FIG. 13). In the illustrated embodiment, the retention features 480 include retention tabs 482. The retention tabs 482 are configured to be received in pockets in the ground bus 300. The retention tabs 482 may extend forward from the front of the cable yoke 400, such as from the connecting walls 434, 464. In an exemplary embodiment, the retention features 482 are shaped to prevent pull out of the cable yoke 400 from the ground bus 300, such as in a rearward direction. The retention features 482 may be captured in the ground bus 300, such as by an interference fit. The retention features 482 may be electrically coupled to the ground bus 300.

Figure 17:
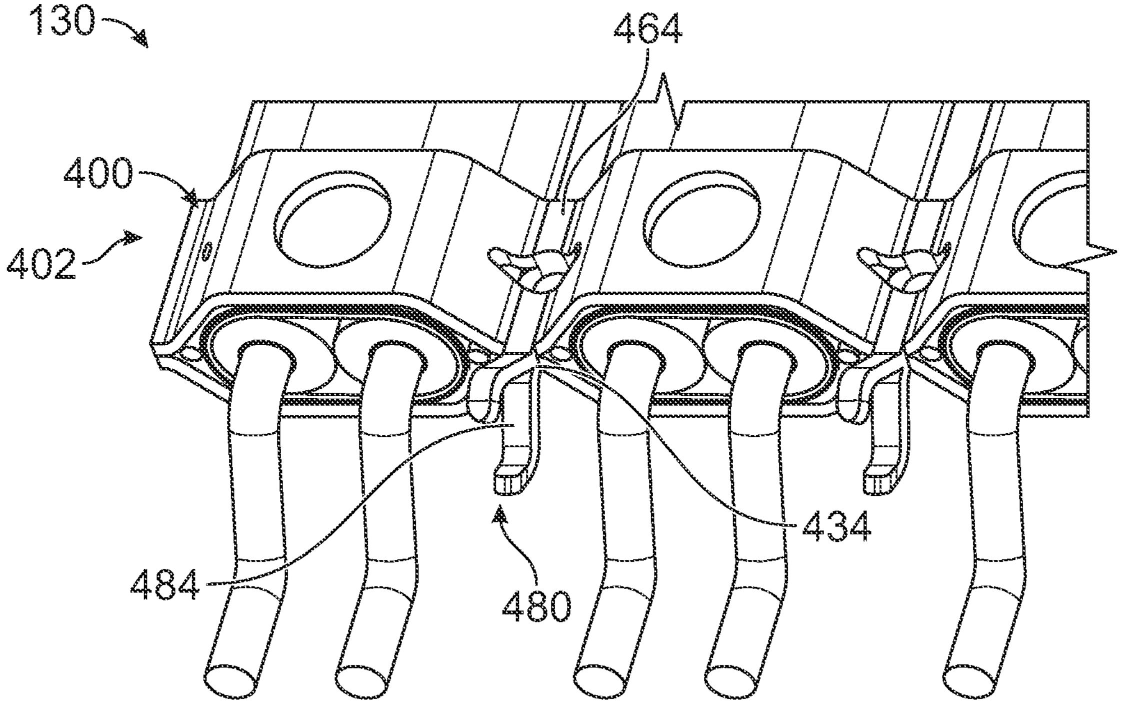
FIG. 17 is a front perspective view of a portion of the cable card assembly in accordance with an exemplary embodiment showing the cable assembly in accordance with an exemplary embodiment.

FIG. 17 is a front perspective view of a portion of the cable card assembly 130 in accordance with an exemplary embodiment showing the cable assembly 402 in accordance with an exemplary embodiment. In an exemplary embodiment, the cable yoke 400 includes the retention features 480 used to retain the cable assembly 402 in the ground bus 300 (shown in FIG. 13). In the illustrated embodiment, the retention features 480 include spring beams 484. The spring beams 484 are configured to be received in pockets in the ground bus 300. The spring beams 484 may extend forward from the front of the cable yoke 400, such as from the connecting walls 434, 464. In an exemplary embodiment, the spring beams 484 are deflectable. The spring beams 484 may be spread outward in the pocket to prevent pull out of the cable yoke 400 from the ground bus 300, such as in a rearward direction. The spring beams 484 may be spring biased against the ground bus 300 to electrically couple to the ground bus 300.

Figure 18:
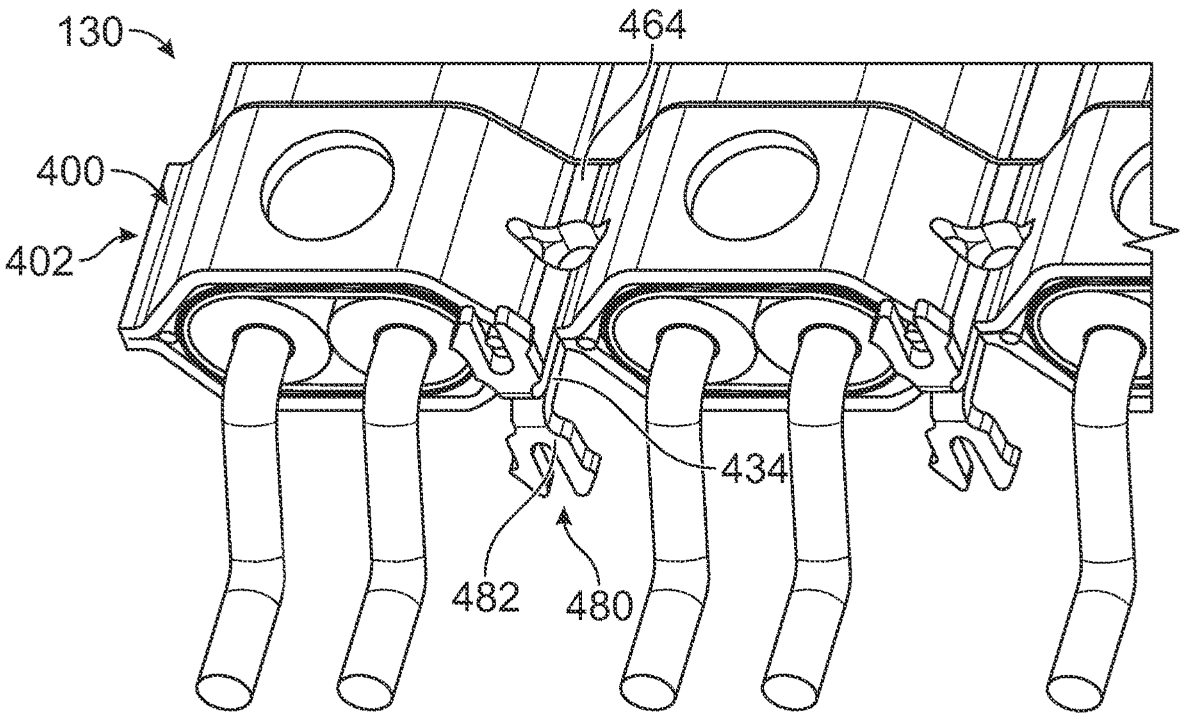
FIG. 18 is a front perspective view of a portion of the cable card assembly in accordance with an exemplary embodiment showing the cable assembly in accordance with an exemplary embodiment.

FIG. 18 is a front perspective view of a portion of the cable card assembly 130 in accordance with an exemplary embodiment showing the cable assembly 402 in accordance with an exemplary embodiment. In an exemplary embodiment, the cable yoke 400 includes the retention features 480 used to retain the cable assembly 402 in the ground bus 300 (shown in FIG. 13). In the illustrated embodiment, the retention features 480 include compliant pins 486. The compliant pins 486 are configured to be plugged into openings in the ground bus 300, such as into the inner bus member 304 and the outer bus member 306. The compliant pins 486 may extend forward from the front of the cable yoke 400, such as from the connecting walls 434, 464. In an exemplary embodiment, the compliant pins 486 are shaped to prevent pull out of the cable yoke 400 from the ground bus 300, such as in a rearward direction. The compliant pins 486 may be press fit into the ground bus 300. The compliant pins 486 may be electrically coupled to the ground bus 300.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, in the following claims, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase “means for” followed by a statement of function void of further structure.

What is claimed is:

1. A cable card assembly for an electrical connector comprising:

a circuit card having an upper surface and a lower surface, the circuit card having a cable end and a mating end opposite the cable end, the circuit card having mating conductors at the mating end for mating with a mating electrical connector, the circuit card having circuit conductors at the cable end, the circuit card having a ground plane;

cables terminated to the circuit card, the cables including signal conductors and cable shields surrounding the corresponding signal conductors to provide electrical shielding for the signal conductors;

a cable yoke holding the cables in fixed positions relative to each other, the cable yoke including cable troughs at spaced apart positions receiving the corresponding cables, the cable yoke being electrically connected to the cable shields; and a ground bus coupled to the ground plane of the circuit card, the ground bus having cable pockets receiving the cable yoke and the corresponding cables, wherein the cable yoke positions the cables in the cable pockets relative to the ground bus, the ground bus being electrically connected to the cable yoke to electrically connect the cable shields of the cables to the ground plane of the circuit card.

2. The cable card assembly of claim 1, wherein the cable yoke is stamped and formed from one or more metal sheets.

3. The cable card assembly of claim 1, wherein the cable yoke includes an inner yoke member and an outer yoke member separate and discrete from the inner yoke member, the outer yoke member being coupled to the inner yoke member to form the cable yoke, the cables being captured in the cable troughs between the inner yoke member and the outer yoke member.

4. The cable card assembly of claim 3, wherein the inner yoke member includes inner cable troughs receiving the corresponding cables and the outer yoke member includes outer cable troughs receiving the corresponding cables, the inner yoke member including inner connecting walls between the inner cable troughs and the outer yoke member includes outer connecting walls between the outer cable troughs, the inner connecting walls being laser welded to the outer connecting walls to form the cable yoke.

5. The cable card assembly of claim 1, wherein the cable yoke includes end walls and side walls forming the cable troughs, the end walls extending along opposite ends of each cable trough, the side walls extending along opposite sides of each cable trough, the cable yoke providing 360° shielding around each cable defined by the end walls and the side walls.

6. The cable card assembly of claim 5, wherein the cable yoke includes connecting walls extending between the side walls, the connecting walls spacing the side walls apart from each other to control spacing of the cables.

7. The cable card assembly of claim 1, wherein the cable yoke includes solder openings for soldering the cable shields to the cable yoke.

8. The cable card assembly of claim 1, wherein the cables include drain wires, the drain wires extending into the cable troughs to electrically connect to the cable yoke.

9. The cable card assembly of claim 8, wherein the cable yoke includes openings aligned with the drain wires, the cable yoke being laser welded to the drain wires through the openings.

10. The cable card assembly of claim 1, wherein the cable yoke includes retention features engaging the ground bus to secure the cable yoke relative to the ground bus.

11. The cable card assembly of claim 1, wherein the ground bus includes an inner bus member and an outer bus member, the inner bus member located between the outer bus member and the circuit card, the cable yoke and the cables being received between the inner bus member and the outer bus member.

12. A cable card assembly for an electrical connector comprising:

a circuit card having an upper surface and a lower surface, the circuit card having a cable end and a mating end opposite the cable end, the circuit card having mating conductors at the mating end for mating with a mating electrical connector, the circuit card having circuit conductors at the cable end, the circuit card having a ground plane;

cables terminated to the circuit card, the cables including signal conductors and cable shields surrounding the corresponding signal conductors to provide electrical shielding for the signal conductors;

a cable yoke holding the cables in fixed positions relative to each other, the cable yoke including an inner yoke member and an outer yoke member coupled to the inner yoke member, the inner yoke member including inner cable troughs receiving the corresponding cables, the outer yoke member including outer cable troughs receiving the corresponding cables, the inner yoke member including inner connecting walls between the inner cable troughs, the outer yoke member including outer connecting walls between the outer cable troughs, the inner connecting walls being laser welded to the outer connecting walls to form the cable yoke, the cable yoke being electrically connected to the cable shields; and a ground bus coupled to the ground plane of the circuit card, the ground bus having cable pockets receiving the cable yoke and the corresponding cables, wherein the cable yoke positions the cables in the cable pockets relative to the ground bus, the ground bus being electrically connected to the cable yoke to electrically connect the cable shields of the cables to the ground plane of the circuit card.

13. The cable card assembly of claim 12, wherein the cables are captured in the cable troughs between the inner yoke member and the outer yoke member.

14. The cable card assembly of claim 12, wherein the inner yoke member and the outer yoke member are identical and inverted 180° relative to each other.

15. The cable card assembly of claim 12, wherein the cable yoke includes end walls and side walls forming the cable troughs, the end walls extending along opposite ends of each cable trough, the side walls extending along opposite sides of each cable trough, the cable yoke providing 360° shielding around each cable defined by the end walls and the side walls.

16. The cable card assembly of claim 12, wherein the cable yoke includes solder openings for soldering the cable shields to the cable yoke.

17. The cable card assembly of claim 12, wherein the cables include drain wires, the drain wires extending into the cable troughs to electrically connect to the cable yoke.

18. The cable card assembly of claim 12, wherein the cable yoke includes retention features engaging the ground bus to secure the cable yoke relative to the ground bus.

19. The cable card assembly of claim 12, wherein the ground bus includes an inner bus member and an outer bus member, the inner bus member located between the outer bus member and the circuit card, the cable yoke and the cables being received between the inner bus member and the outer bus member.

20. An electrical connector comprising:

a housing having walls forming a cavity, the housing having a mating end at a front of the housing configured to be mated with a mating electrical connector; and a cable card assembly received in the cavity of the housing, the cable card assembly including a circuit card, cables terminated to the circuit card, a cable yoke holding the cables, and a ground bus providing shielding for the cables, the circuit card having an upper surface and a lower surface, the circuit card having a cable end and a mating end opposite the cable end, the circuit card having mating conductors at the mating end for mating with the mating electrical connector, the circuit card having circuit conductors at the cable end, the circuit card having a ground plane and the ground bus being coupled to the ground plane, the cables including signal conductors and cable shields surrounding the corresponding signal conductors to provide electrical shielding for the signal conductors, the cable yoke including cable troughs receiving the corresponding cables and holding the cables in fixed positions relative to each other, the cable yoke being electrically connected to the cable shields, the ground bus having cable pockets receiving the cable yoke and the corresponding cables, wherein the cable yoke positions the cables in the cable pockets relative to the ground bus, the ground bus being electrically connected to the cable yoke to electrically connect the cable shields of the cables to the ground plane of the circuit card.

* * * * *